United States Patent
Pallos

[11] 3,864,334
[45] Feb. 4, 1975

[54] DERIVATIVES OF CERTAIN N-OXYPRIDYL GERANYL ETHERS AND THEIR USE IN CONTROLLING INSECTS

[75] Inventor: Ferenc M. Pallos, Walnut Creek, Calif.

[73] Assignee: Stauffer Chemical Company, Westport, Conn.

[22] Filed: Nov. 2, 1973

[21] Appl. No.: 412,091

[52] U.S. Cl...... 260/240 H, 260/240 R, 260/297 R, 424/263
[51] Int. Cl............................................. C07d 31/28
[58] Field of Search......... 260/240 H, 297 R, 240 R

[56] References Cited
UNITED STATES PATENTS

| | | | |
|---|---|---|---|
| 3,563,982 | 2/1971 | Bowers | 260/240 H |
| 3,701,759 | 10/1972 | Lee et al. | 260/240 H |
| 3,766,208 | 10/1973 | Lee et al. | 260/240 H |

*Primary Examiner*—Arthur P. Demers
*Attorney, Agent, or Firm*—Edwin H. Baker

[57] ABSTRACT

The compounds of the present invention that are useful in controlling insects are those having the formula

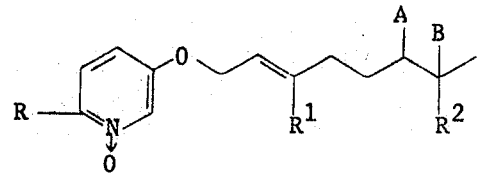

in which R is hydrogen, halogen, or lower alkyl; $R^1$ is methyl or ethyl; $R^2$ is methyl or ethyl; A and B together form an oxygen bridge or a bond, or A is hydrogen and B is hydrogen, methoxy or ethoxy and the use of these compounds in controlling insects.

3 Claims, No Drawings

DERIVATIVES OF CERTAIN N-OXYPRIDYL GERANYL ETHERS AND THEIR USE IN CONTROLLING INSECTS

This invention relates to the use of certain novel chemical compounds in combating noxious insects, more particularly, the chemical compounds are certain derivatives of N-oxypyridyl geranyl ethers.

A new class of selective compounds has been found which exerts a disrupting influence upon the normal development of insects. Such compounds impede the metamorphosis of larvae to pupae and pupae to adults resulting in the formation of abnormal members of the treated species which may also be non-viable or sterile. This ultimately leads, indirectly at least, to the destruction of a pest population.

The compounds of the present invention are believed to have further advantages in that they are non-toxic to warm-blooded animals and highly effective in controlling insects at low dosages.

One embodiment of the present invention is concerned with novel pesticidal compounds.

In still another embodiment, the invention is concerned with a process for controlling insects by hindering or impeding the metamorphosis and reproduction of the insects.

The compounds of the present invention that are useful in controlling insects are those having the formula

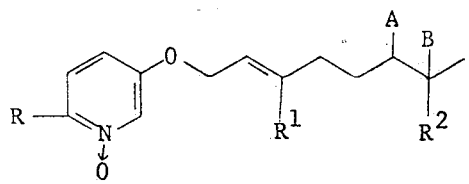

in which R is hydrogen; halogen, preferably chlorine or bromine; or alkyl having one to four carbon atoms, preferably one to three carbon atoms, more preferably methyl, ethyl or isopropyl; $R^1$ is methyl or ethyl, preferably methyl; $R^2$ is methyl or ethyl, preferably methyl; A and B together form an oxygen bridge or a bond, or A is hydrogen and B is hydrogen, methoxy or ethoxy.

The most preferred compounds, because of their exceptional activity, are those in which R is ethyl; $R^1$ is methyl; $R^2$ is methyl; A and B together form an oxygen bridge or A is hydrogen and B is ethoxy.

Carbon atoms, joined to two or less hydrogen atoms, occupy each angle in the backbone of the compound represented by the above formula unless otherwise specified.

As indicated heretofore, the above compounds are useful in impeding the metamorphosis and/or the reproduction of insects. The activity of the compounds is such that insects at any stage of their development can be effectively treated therewith.

The compounds of the present invention having the formula

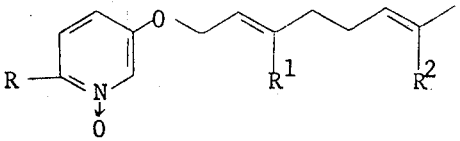

in which R, $R^1$ and $R^2$ are as defined, can be prepared by the following reaction:

Reaction 1)

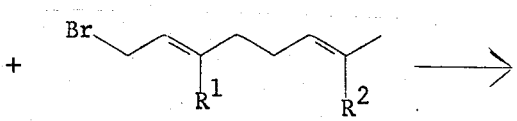

Preferably, reaction number 1 is carried out in a solvent such as 1,2-dimethoxyethane, with stirring by slowly adding an acid acceptor, such as a diluted solution of alcoholic KOH, at room temperature, followed by heating at reflux to complete the reaction. The reaction product is recovered by conventional techniques such as stripping off the solvent in vacuum, extracting the residue with ether, washing the ether phase with 10% KOH solution and then with water, followed by drying with anhydrous $MgSo_4$. Finally, the drying agent is filtered off and the ether is removed by vacuum stripping.

Preferably, reaction number 1 is carried out using equal mole amounts of the reactant, although an excess of either reactant can be used.

Compounds having the formula

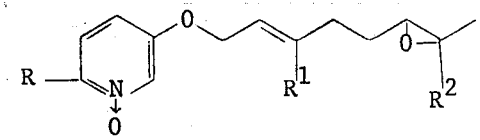

in which R, $R^1$ and $R^2$ are as defined can be prepared by the following reactions:

Reaction 2)

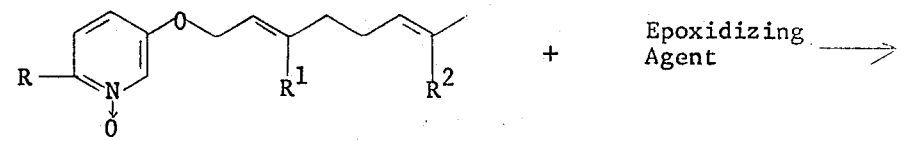
+ Epoxidizing Agent $\longrightarrow$

Reaction 3)

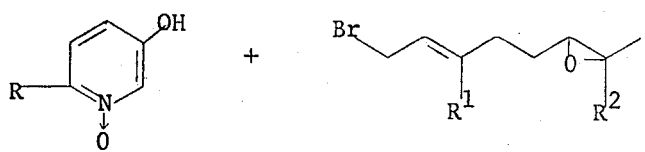 + 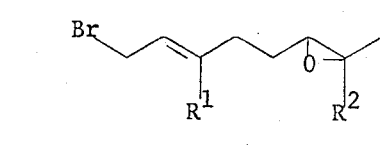

Preferably, reaction number 2 is carried out in a solvent such as methylene chloride, preferably the epoxidizing agent is added slowly with stirring at a temperature sufficient to give a controlled reaction, such as about 5°C. to about 10°C. Preferably, reaction number 2 is carried out using about equal mole amounts of the reactants, or with a slight excess of the epoxidizing agent. The reaction product is recovered by conventional means.

Preferably, reaction number 3 is carried out in similar manner to reaction number 2.

The epoxidizing agents are well-known to those skilled in the art and include such materials as meta-chloroperbenzoic acid. Reference is made to *Kirk-Othmer Encyclopedia of Chemical Technology*, 2nd. Edition, 1965, Vol. 8, pages 238–244, for a discussion of various types of epoxidizing agents.

Preparation of the compounds of this invention is illustrated by the following examples.

EXAMPLE I

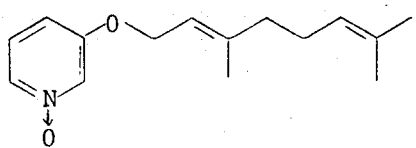

2.2 grams (0.02 mole) 3-hydroxy-pyridine-N-oxide, 4.4 grams (0.02 mole) geranyl bromide, 22 ml. 1,2-dimethoxyethane are mixed in a 3 necked flask equipped with a thermometer, dropping funnel, stirrer and reflux condenser. 22.0 ml. KOH (0.1 mole solution in 95% ethyl alcohol) are slowly added. After the addition, the mixture is heated to reflux for 2 hours and allowed to stand overnight. The resulting mixture is evaporated to dryness, dissolved in ether, and washed with water. Next, the ether solution is washed with 10% KOH solution twice and again with water. The mixture is dried over $MgSO_4$, filtered and stripped to yield 1.5 grams of the desired product. I.R. and n.m.r. analysis confirm the structure.

EXAMPLE II

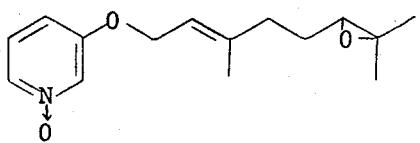

1.2 grams (0.005 mole) of the product of Example I is dissolved in 25 ml. $CH_2Cl_2$ and 25 ml. m-perbenzoic acid dissolved in $CH_2Cl_2$ is added slowly dropwise at a temperature between 5° – 10°C. utilizing an ice bath.

After the addition, the mixture is stirred slowly at room temperature for 1 hour. The resulting product is washed with 10% $NaHCO_3$, dried over $MgSO_4$, filtered and stripped to yield 0.8 grams of the desired product. The structure is confirmed by I.R. and n.m.r. analysis.

The following is a table of certain selected compounds that are preparable according to the procedures described hereto. Compound numbers are assigned to each compound and are used throughout the remainder of the specification.

TABLE I

| Compound Number | $R^1$ | $R^2$ | A | B | R |
|---|---|---|---|---|---|
| 1[a] | $CH_3$ | $CH_3$ | bond | | H |
| 2 | $CH_3$ | $CH_3$ | H | H | $CH_3$ |
| 3 | $CH_3$ | $CH_3$ | H | H | $C_2H_5$ |
| 4 | $CH_3$ | $CH_3$ | H | H | $i\text{-}C_3H_7$ |
| 5 | $C_2H_5$ | $C_2H_5$ | H | H | $CH_3$ |
| 6 | $CH_3$ | $CH_3$ | H | H | Cl |
| 7 | $CH_3$ | $CH_3$ | H | H | Br |
| 8 | $CH_3$ | $CH_3$ | H | $CH_3O$ | H |
| 9 | $CH_3$ | $CH_3$ | H | $CH_3O$ | $CH_3$ |
| 10 | $CH_3$ | $CH_3$ | H | $CH_3O$ | $C_2H_5$ |
| 11 | $CH_3$ | $CH_3$ | H | $CH_3O$ | $i\text{-}C_3H_7$ |
| 12 | $CH_3$ | $CH_3$ | H | $CH_3O$ | Cl |
| 13 | $CH_3$ | $CH_3$ | H | $CH_3O$ | Br |
| 14 | $CH_3$ | $CH_3$ | H | $C_2H_5O$ | H |
| 15 | $CH_3$ | $CH_3$ | H | $C_2H_5O$ | $CH_3$ |
| 16 | $CH_3$ | $CH_3$ | H | $C_2H_5O$ | $C_2H_5$ |
| 17 | $CH_3$ | $CH_3$ | H | $C_2H_5O$ | $i\text{-}C_3H_7$ |
| 18 | $CH_3$ | $CH_3$ | H | $C_2H_5O$ | Cl |
| 19 | $CH_3$ | $CH_3$ | H | $C_2H_5O$ | Br |
| 20[b] | $CH_3$ | $CH_3$ | oxygen bridge | | H |
| 21 | $CH_3$ | $CH_3$ | oxygen bridge | | $CH_3$ |
| 22 | $CH_3$ | $CH_3$ | oxygen bridge | | $C_2H_5$ |
| 23 | $CH_3$ | $CH_3$ | oxygen bridge | | $i\text{-}C_3H_7$ |
| 24 | $CH_3$ | $CH_3$ | bond | | Cl |
| 25 | $CH_3$ | $CH_3$ | oxygen bridge | | Br |

[a] Prepared in Example I
[b] Prepared in Example II

INSECTICIDAL EVALUATION TEST

The degree of activity of a candidate compound to hinder or impede the metamorphosis of insects is measured by treating the penultimate larval stage of a representative insect with the compound and examining it after its last molt toward the adult form for retention of immature features.

Specifically, yellow mealworm, *Telebrio molitor*, L., larvae are maintained at 27°C. and 55 percent humidity on a diet of brand flakes. Prepupae are collected from the culture and kept in separate containers. The pupae collected once daily, are 1–25 hours old at the time of treatment. By means of a syringe, suitable amounts of candidate compounds in 1.0 $\mu l$ of acetone are applied to the venter of Tenebrio molitor, L. pupae. Treated pupae are maintained at 28°C. and 40 percent humidity until the adults emerged (usually within 6-8 days). Emerged adults are graded as positive, negative, or dead. To be considered a positive response, the presence of typical pupal cuticle, urogomphi, gin trap, and abnormal wings, etc., are required. For each test, 1 group of 10 pupae is used.

The dose of a candidate compound per pupa that is needed to give a positive response in the above insecticidal evaluation test for 5 of the 10 pupae is determined. Table II shows these doses under the column $ED_{50}$, the "ED" being an abbreviation for effective dose.

TABLE II

| COMPOUND Number | *T. Molitor* $ED_{50}$-$\mu g$/pupa |
|---|---|
| 1 | 50.0 |
| 2 | 5.0 |

The compounds of this invention are generally embodied into a form suitable for convenient application. For example, the compounds can be embodied into pesticidal composition which are provided in the form of emulsions, suspensions, solutions, dusts, and aerosol sprays. In general, such compositions will contain, in addition to the active compound, the adjuvants which are found normally in pesticide preparations. In these compositions the active compounds of this invention can be employed as the sole pesticide component or they can be used in admixture with other compounds having similar utility. The pesticide compositions of this invention can contain, as adjuvants, organic solvents, such as sesame oil, xylene range solvents, heavy petroleum, etc.; water; emulsifying agents; surface active agents; talc; pyrophyllite; diatomite; gypsum; clays; propellants, such as dichlorodifluoromethane, etc. If desired, however the active compounds can be applied directly to feedstuffs, seeds, etc. upon which the pests feed. When applied in such a manner, it will be advantageous to use a compound which is not volatile. In connection with the activity of the presently disclosed pesticidal compounds, it should be fully understood that it is not necessary that they be active as such. The purposes of this invention will be fully served if the compound is rendered active by external influences such as light or by some physiological action which occurs when the compound is ingested into the body of the pest.

The precise manner in which the pesticidal compositions of this invention are used in any particular instance will be readily apparent to a person skilled in the art. Generally, the active pesticide compound will be embodied in the form of a liquid composition, for example, an emulsion, suspension, or aerosol spray. While the concentration of the active pesticide in the present compositions can vary within rather wide limits, ordinarily the pesticide compound will comprise not more than about 50% by weight of the composition. Preferably, however, the pesticide compositions of this invention will be in the form of solutions or suspensions containing about 0.1 to 1.0% weight of the active pesticide compound.

What is claimed is:

1. a compound of the formula:

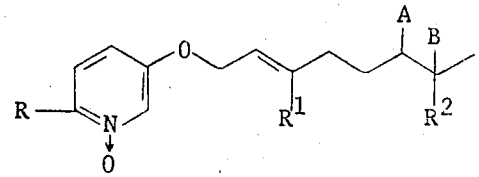

in which R is hydrogen; halogen; or alkyl having one to four carbon atoms; $R^1$ is methyl or ethyl; $R^2$ is methyl or ethyl; A and B together form an oxygen bridge or a bond, or A is hydrogen and B is hydrogen, methoxy or ethoxy.

2. The compound of claim 1 in which R is hydrogen; $R^1$ is methyl; $R^2$ is methyl and A and B are each hydrogen.

3. The compound of claim 1 in which R is hydrogen, $R^1$ is methyl; $R^2$ is methyl and A and B together form an oxygen bridge.

* * * * *